(12) United States Patent
Moore et al.

(10) Patent No.: US 9,752,645 B1
(45) Date of Patent: Sep. 5, 2017

(54) ANTI-VIBRATION DEVICE

(71) Applicant: Hutchinson Antivibration Systems Inc., Grand Rapids, MI (US)

(72) Inventors: Daniel Moore, Belmont, MI (US); Franck Larmande, Grand Rapids, MI (US)

(73) Assignee: HUTCHINSON ANTIVIBRATION SYSTEMS INC., Grand Rapids, MI (US)

(*) Notice: Subject to any disclaimer, the term of this patent is extended or adjusted under 35 U.S.C. 154(b) by 0 days.

(21) Appl. No.: 15/133,441

(22) Filed: Apr. 20, 2016

(51) Int. Cl.
| F16F 1/36 | (2006.01) |
| F16F 15/08 | (2006.01) |
| B60K 5/12 | (2006.01) |
| F16F 1/50 | (2006.01) |

(52) U.S. Cl.
CPC ............ F16F 15/08 (2013.01); B60K 5/1208 (2013.01); F16F 1/36 (2013.01); F16F 1/50 (2013.01); *F16F 2228/06* (2013.01)

(58) Field of Classification Search
CPC .. F16F 1/50; F16F 1/36; F16F 2228/06; F16F 15/08; B60K 5/1208
See application file for complete search history.

(56) References Cited

U.S. PATENT DOCUMENTS

| 6,955,343 | B2 | 10/2005 | Compain | |
| 8,881,491 | B2* | 11/2014 | Christopoulos | ......... E04H 9/022 52/167.1 |
| 2002/0154940 | A1* | 10/2002 | Certain | ................... B64C 27/51 403/24 |
| 2009/0032673 | A1* | 2/2009 | Dron | ...................... B64D 27/26 248/557 |

FOREIGN PATENT DOCUMENTS

| CA | 2524547 | A1 | * | 4/2007 | ............ E04H 9/022 |
| DE | 647834 | C | * | 7/1937 | ............... F16F 1/50 |
| EP | 0647787 | B1 | | 3/1999 | |
| EP | 0894659 | B1 | | 10/2001 | |
| EP | 1452750 | B1 | | 6/2010 | |
| GB | 490031 | A | * | 8/1938 | ............... F16F 1/50 |

OTHER PUBLICATIONS

Machine translation of DE 647,834 (no date).*

* cited by examiner

*Primary Examiner* — Nicholas J Lane
(74) *Attorney, Agent, or Firm* — Miller, Matthias & Hull LLP

(57) ABSTRACT

An anti-vibration device including first and second rigid strength members interconnected by an elastomer body, the first strength member includes a base and at least three branches extending from the base along a first direction toward the second strength member, the three branches including two external branches and one central branch. The second strength member includes a transversal portion and at least two branches extending along the first direction from the transversal portion, respectively between the external branches and the central branch of the first strength member. The elastomer body extends transversally to the first direction between the external branches of the first strength member and has four legs extending respectively between the branches of the first strength member and the branches of the second strength member.

1 Claim, 1 Drawing Sheet

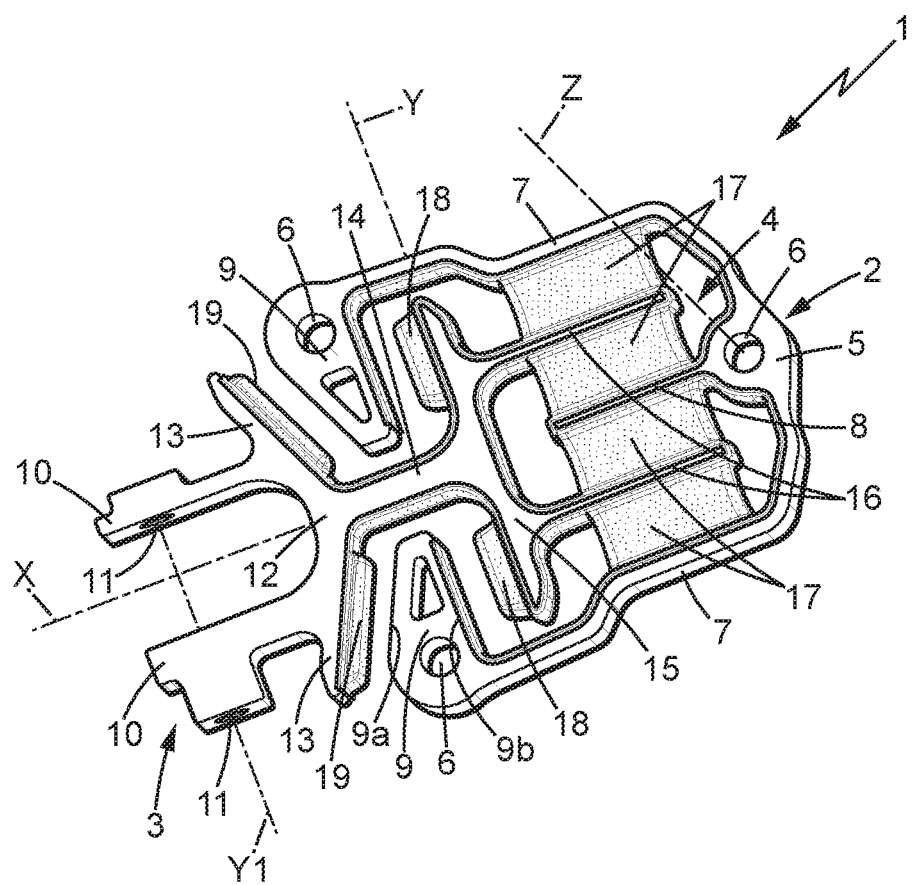

ANTI-VIBRATION DEVICE

CROSS-REFERENCE TO RELATED APPLICATIONS

This patent application claims priority under the 35 USC §119(e) to U.S. Provisional Patent Application Ser. No. 62/092,669, filed on Dec. 16, 2014.

FIELD OF THE DISCLOSURE

The present invention relates to anti-vibration devices.

The invention concerns more particularly an anti-vibration device including at least first and second rigid strength members interconnected by an elastomer body.

BACKGROUND OF THE DISCLOSURE

Such antivibration devices are used for instance as torque rods or links, to connect a vehicle motor to a vehicle chassis.

One particular object of the present invention is to improve anti-vibration devices of the above type, in particular for obtaining different stiffnesses in different directions.

SUMMARY OF THE DISCLOSURE

To this end, according to the invention, the first strength member includes a base and at least three branches extending from the base substantially along a first direction toward the second strength member, said at least three branches including two external branches and one central branch, the second strength member includes a transversal portion and at least two branches extending along the first direction from the transversal portion, respectively between the external branches and the central branch of the first strength member, and the elastomer body extends transversally to the first direction between the external branches of the first strength member and has at least four legs extending respectively between the branches of the first strength member and the branches of the second strength member. Thus, the stiffness of the antivibration device is higher in the transversal direction compared to the first direction.

BRIEF DESCRIPTION OF THE DRAWINGS

Other features and advantages of the invention will become apparent in the course of the following description of one embodiment thereof given by way of nonlimiting example with reference to the appended drawings.

In the drawings, FIG. 1 is a perspective view of an antivibration device according to one embodiment of the invention.

DETAILED DESCRIPTION OF THE DISCLOSURE

In the various FIGURES, the same references designate identical or similar elements.

FIG. 1 shows an anti-vibration device 1, for instance a torque rod or link used to connect a vehicle motor to a vehicle chassis, in a first direction X.

The antivibration device 1 includes at least first and second rigid strength members 2, 3 interconnected by an elastomer body 4.

The first strength member 2 may be designed to be fixed to the vehicle chassis. The first strength member 2 includes a base 5 extending substantially in a second, transversal direction Y perpendicular to the first direction X. The first strength member 2 also includes at least three branches 7, 8 which are rigid with the base 5 and are extending from the base substantially along the first direction X toward the second strength member 3, said at least three branches including two external branches 7 and one central branch 8. The free ends of the external branches 7 may be extended inwardly toward each other by noses 9. Each nose may have one face 9b facing the base 5, extending substantially parallel to the second direction Y, and one opposite face 9a which may be formed slantwise, with slope toward the centre and the base 5. The base 5 and possibly external branches 7 or noses 9, may include hole(s) 6 opening in a third direction Z perpendicular to the first and second directions, for fixing the first strength member to the vehicle chassis.

The second strength member 3 includes a connecting portion 10, 12 designed to be fixed to the vehicle motor. The connecting portion may be U shaped and may include a base 12 and two flanges 10 extending from the base 12 along the first direction X, opposite the first strength member 2, The flanges may be designed to be pivotally connected to the motor around a pivot axis Y1 parallel to the transversal direction Y. For instance, the flanges may have holes 11 aligned along axis Y1 for pivotal connection to the motor. The base 12 may have two slantwise abutment faces 13, respectively parallel to the faces 9a of the first strength member 2. The second strength member 3 may also have a central bar 14 rigid with the base 12 and extending parallel to the first direction X from the base 12, toward the base 5 of the first strength member 2. The free end of the central bar is rigid with a transversal portion 15 extending in the second direction Y between the base 5 and the faces 9b of the noses 9 of the first strength member 2. The second strength member 3 also has at least two branches extending along the first direction X from the transversal portion 15, respectively between the external branches 7 and the central branch 8 of the first strength member.

The branches 8, 16 may have reduced thickness in the second direction Y, compares to other portions of the first and second strength member 2, 3.

The elastomer body mainly extends in the second direction Y between the external branches 8 of the first strength member and has at least four legs 17 extending respectively between the branches 7, 8 of the first strength member and the branches 16 of the second strength member. The anti-vibration device thus has a high stiffness in the second direction and a lower stiffness in the first direction X.

The stiffness in the first direction X is controlled in particular by the number of branches 7, 8, 16. It may be possible to have more than one central branch 8 and more than two branches 16.

The antivibration device may also include elastomer pads 18, 19, preferably belonging to the elastomer body, formed for instance on the abutment faces 13 facing the faces 9a of the noses 9, and on the transversal portion 15 facing the faces 9b of the noses 9, for limiting the relative movement between the first and second strength members 2, 3 in the first direction X.

The invention claimed is:

1. An anti-vibration device including at least first and second rigid strength members interconnected by an elastomer body, wherein the first strength member includes a base and at least three branches extending from the base substantially along a first direction toward the second strength member, said at least three branches including two external branches and one central branch, said external branches extending from the base further than the central branch and being extended inwardly toward each other by noses, wherein the second strength member includes a transversal portion and at least two branches extending along the first direction from the transversal portion, respectively between the external branches and the central branch of the first strength member, said second strength member including a central bar extending from the transversal portion up to outwardly extending stop members, wherein said noses of the first strength member are respectively disposed for abutment against said transversal portion and said stop members, said stop members being disposed to avoid contact of the branches of the second strength member against the base of the first strength member in the first direction and to avoid contact of the branches of the first strength member against the transversal portion of the second strength member in the first direction, and wherein the elastomer body extends transversally to the first direction between the external branches of the first strength member and has at least four legs extending respectively between the branches of the first strength member and the branches of the second strength member.

\* \* \* \* \*